United States Patent
Arioka et al.

(10) Patent No.: US 7,221,637 B2
(45) Date of Patent: May 22, 2007

(54) MULTI-LEVEL OPTICAL RECORDING MEDIUM, MULTI-LEVEL RECORDING METHOD, AND MULTI-LEVEL REPRODUCTION METHOD

(75) Inventors: Hiroyuki Arioka, Tokyo (JP); Syuji Tsukamoto, Tokyo (JP); Takashi Horai, Tokyo (JP)

(73) Assignee: TDK Corporation, Tokyo (JP)

( * ) Notice: Subject to any disclaimer, the term of this patent is extended or adjusted under 35 U.S.C. 154(b) by 662 days.

(21) Appl. No.: 10/478,302

(22) PCT Filed: Jun. 4, 2002

(86) PCT No.: PCT/JP02/05519

§ 371 (c)(1),
(2), (4) Date: Dec. 3, 2003

(87) PCT Pub. No.: WO02/099792

PCT Pub. Date: Dec. 12, 2002

(65) Prior Publication Data

US 2004/0151103 A1    Aug. 5, 2004

(30) Foreign Application Priority Data

Jun. 5, 2001    (JP)    ............................. 2001-169915

(51) Int. Cl.
G11B 7/00    (2006.01)

(52) U.S. Cl. ................................. 369/59.25; 369/275.3

(58) Field of Classification Search ...................... None
See application file for complete search history.

(56) References Cited

U.S. PATENT DOCUMENTS 3,962,720 A    6/1976    Braat (Continued)

FOREIGN PATENT DOCUMENTS

EP    1235210    8/2002

(Continued)

OTHER PUBLICATIONS

English Language Abstract JP2001-18647.

(Continued)

*Primary Examiner*—Andrea Wellington
*Assistant Examiner*—Peter Vincent Agustin
(74) *Attorney, Agent, or Firm*—Greenblum & Bernstein, P.L.C.

(57)    ABSTRACT

A multi-level optical recording medium according to the present invention is a multi-level optical recording medium (1) which is capable of recording record data according to multi-level recording that defines light reflection ratios of recording portions (12) into multiple levels by switching the irradiation amount of a recording laser beam between multiple levels, wherein light reflection ratio information enabling identification of a light reflection ratio dynamic range within which respective light reflection ratios of the recording portions (12) should be included is readably recorded. Due to this construction, when record data are recorded, it is only required to record the record data such that the respective light reflection ratios of the recording portions (12) are included within the light reflection ratio dynamic range identified from the light reflection ratio information, and it is unnecessary to perform the operation of checking the characteristics of the multi-level optical recording medium (1) prior to recording the record data. Therefore, it is possible to record the record data promptly and easily without wastefully using a data-recording area.

15 Claims, 3 Drawing Sheets

U.S. PATENT DOCUMENTS

| | | | |
|---|---|---|---|
| 5,148,335 A * | 9/1992 | Kudo et al. | 369/59.11 |
| 6,771,570 B1 * | 8/2004 | Wong et al. | 369/30.1 |
| 6,775,218 B1 * | 8/2004 | O'Neill et al. | 369/59.11 |
| 6,987,720 B2 * | 1/2006 | Miura et al. | 369/59.11 |
| 2001/0036143 A1 | 11/2001 | Ohno et al. | |
| 2002/0015371 A1 | 2/2002 | Arioka | |
| 2002/0034604 A1 | 3/2002 | Arioka et al. | |
| 2002/0041555 A1 | 4/2002 | Tsukamoto et al. | |
| 2002/0041556 A1 | 4/2002 | Tsukamoto et al. | |
| 2002/0044512 A1 | 4/2002 | Tsukamoto et al. | |
| 2002/0186648 A1 | 12/2002 | Ohno et al. | |

FOREIGN PATENT DOCUMENTS

| | | |
|---|---|---|
| JP | 59-60742 | 4/1984 |
| JP | 62-88143 | 4/1987 |
| JP | 63-146224 | 6/1988 |
| JP | 1-159832 | 6/1989 |
| JP | 1-154513 | 10/1989 |
| JP | 1-319134 | 12/1989 |
| JP | 2-14427 | 1/1990 |
| JP | 4-111229 | 4/1992 |
| JP | 8-203079 | 8/1996 |
| JP | 2001-018647 | 1/2001 |
| JP | 2001-84591 | 3/2001 |
| JP | 2001-84592 | 3/2001 |
| JP | 2001-184647 | 7/2001 |
| JP | 2001-184648 | 7/2001 |
| JP | 2001-184649 | 7/2001 |
| JP | 2002-025114 | 1/2002 |
| JP | 2002-083424 | 3/2002 |
| JP | 2002-083425 | 3/2002 |
| JP | 2002-083426 | 3/2002 |
| JP | 2002-083427 | 3/2002 |
| JP | 2002-083428 | 3/2002 |
| JP | 2002-083445 | 3/2002 |
| JP | 2002-083446 | 3/2002 |
| JP | 2002-117539 | 4/2002 |
| JP | 2002-117540 | 4/2002 |
| JP | 2002-117545 | 4/2002 |
| JP | 2002-183954 | 6/2002 |
| WO | 01/27917 | 4/2001 |

OTHER PUBLICATIONS

English Language Abstract JP2002-083446.
English Language AbstractJP 8-203079.
English Language Abstract JP1-159832.
English Language Abstract JP63-146224.
English Language Abstract JP2001-84592.
English Language Abstract 2002-183954.
English Language Abstract JP2001-84591.
English Language Abstract JP2001-184647.
English Language Abstract JP2001-184648.
English Language Abstract JP2001-184649.
English Language Abstract JP2002-025114.
English Language Abstract JP2001-083445.
English Language Abstract JP2002-083424.
English Language Abstract JP2002-083425.
English Language Abstract JP2002-083426.
English Language Abstract JP2002-083427.
English Language Abstract JP2002-083428.
English Language Abstract JP-2002-117539.
English Language Abstract JP2002-117540.
English Language Abstract JP2002-117545.
English Language Abstract JP1-319134.
English Language Abstract JP2-14427.
English Language Abstract JP-4-111229.
English Language Abstract JP59-60742.
English Language Abstract JP62-88143.

* cited by examiner

F I G. 1
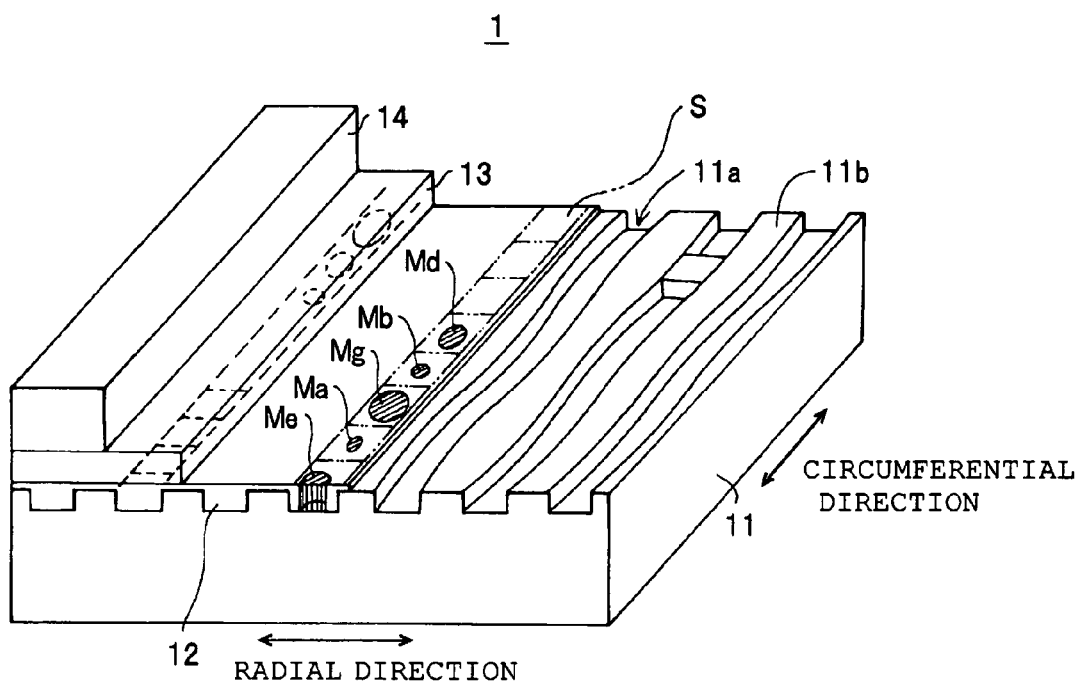
F I G. 2
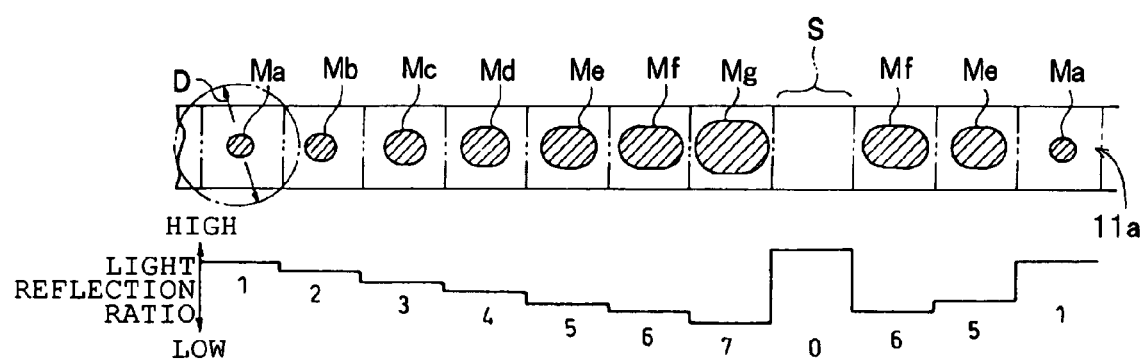

MULTI-LEVEL OPTICAL RECORDING MEDIUM, MULTI-LEVEL RECORDING METHOD, AND MULTI-LEVEL REPRODUCTION METHOD

TECHNICAL FIELD

This invention relates to a multi-level optical recording medium capable of carrying out multi-level recording on one virtual recording cell, and a multi-level recording method and a multi-level production method for the multi-level optical recording medium.

BACKGROUND ART

At present, as an optical recording medium, there is widely used a binary optical recording medium which is configured to record binary data by a pit formed by irradiation of a recording laser beam and enable the binary data to be reproduced based on whether the pit is present or absent. Further, in recent years, to meet the requirement of enhancing recording density of optical recording media, research has been conducted into the recording of data in high density by adjusting the focused beam diameter of a recording laser beam. On the other hand, a multi-level optical recording medium is being developed which is capable of recording one of different marks having a plurality of meanings, respectively, on one virtual recording cell, differently from the method of adjusting the focused beam diameter. In the multi-level optical recording medium, there are utilized, for example, characteristics thereof in which by switching the irradiation amount of a recording laser beam between multiple levels, a portion changed in properties (hereinafter referred to as a "recording mark") appears in a portion of one virtual recording cell as a recording object in the optical recording medium, causing reduction of the light transmission ratio of the cell, and at the same time a proportion of the recording mark to the whole of the one virtual recording cell varies with the irradiation amount of the recording laser beam. In short, in this multi-level optical recording medium, when the reproducing laser beam is irradiated, the light reflection ratio of the reproducing laser beam is affected by the light transmission ratios of virtual recording cells formed with recording marks, so that the reproducing laser beam is reflected at multiple levels (e.g. five or more levels) of light reflection ratios. Therefore, by causing a plurality of data elements to be associated with multiple levels of light reflection ratios, respectively, one virtual recording cell stores one of the data elements. In this case, the term "light transmission ratio" is intended to mean a ratio of a laser beam having passed through the virtual recording cell to the reproducing laser beam irradiated onto the virtual recording cell, and the term "light reflection ratio" is intended to mean a ratio of a laser beam which has passed through the virtual recording cell to be reflected by a reflecting layer of the multi-level optical recording medium, and then has passed through the virtual recording cell again to be emitted out of the multi-level optical recording medium, to the reproducing laser beam irradiated onto the virtual recording cell.

In recording record data on the multi-level optical recording medium, it is necessary to perform recording such that individual data recorded at multiple levels can be reliably identified when they are reproduced. Accordingly, it is preferable that there are certain degrees of difference between the respective light reflection ratios of virtual recording cells having record data recorded thereon at multiple levels. On the other hand, materials used for the recording layer of the multi-level optical recording medium do not have respective unique degrees of change in properties with respect to the irradiation amount of the recording laser beam, but have different degrees of change in properties depending on the characteristics thereof. Therefore, the light reflection ratio of a virtual recording cell having a recording layer thereof unchanged in properties and the light reflection ratio of a virtual recording cell having a recording layer thereof most changed in properties also vary with materials for the recording layer. Therefore, prior to recording record data, it is necessary to specify in advance, for virtual recording cells in the multi-level optical recording medium, at least a light reflection ratio of virtual recording cells having a recording layer thereof most changed in properties and a light reflection ratio of virtual recording cells having a recording layer thereof least changed in properties. To this end, in recording record data on the multi-level optical recording medium at multiple levels, the irradiation amount of the recording laser beam is switched between the multiple levels, e.g. prior to recording the record data, to thereby vary the properties of virtual recording cells to the multiple levels, and the respective light reflection ratios of the virtual recording cells dependent on degrees of change in properties thereof are measured. This specifies the light reflection ratio of virtual recording cells having a recording layer thereof most changed in properties and the light reflection ratio of virtual recording cells having a recording layer thereof least changed in properties. Thereafter, the record data is recorded by controlling the light reflection ratio of a laser beam to multiple levels according to the record data such that the respective light reflection ratios of virtual recording cells are included between the two specified light reflection ratios.

On the other hand, in reproducing the record data recorded on the multi-level optical recording medium, it is possible to reproduce the record data only by identifying which of the multiple levels of light reflection ratios are exhibited by virtual recording cells having the reproducing laser beam irradiated thereon. Therefore, prior to reproducing the record data, it is necessary to identify in advance, in the multi-level optical recording medium, at least the light reflection ratio of a virtual recording cell having the recording layer thereof most changed in properties, and the light reflection ratio of a virtual recording cell having the recording layer thereof least changed in properties. Therefore, when record data recorded on the multi-level optical recording medium are reproduced, the respective light reflection ratios of a predetermined number of virtual recording cells are measured sequentially from a first virtual recording cell, e.g. prior to reproduction of the record data, thereby identifying how many levels the light reflection ratios of the virtual recording cells are defined into and how the light reflection ratios of the virtual recording cells are defined. After that, the record data are reproduced based on the respective identified levels of light reflection ratios.

DISCLOSURE OF THE INVENTION

From the study of the above described conventional multi-level optical recording medium, multi-level recording method, and multi-level reproduction method, the present inventors found out the following points for improvement: In the conventional multi-level recording method, prior to recording record data, it is necessary to change the properties of virtual recording cells to multiple levels and measure the respective light reflection ratios of the virtual recording cells dependant on degrees of change in properties of the virtual recording cells. Further, as described above, the materials used for the recording layer of the multi-level optical recording medium are different in degrees of change in properties with respect to the irradiation amount of the recording laser beam, depending on the characteristics of the materials. On the other hand, when multi-level recording and reproduction is performed, it is preferable to use optimum ranges in the dynamic range of light reflection ratios (relative light reflection ratio dynamic range, which will be described in detail hereinafter) depending on the various kinds of materials for the recording layer. For example, a material A has a characteristic that a range of light reflection ratios from a higher light reflection ratio of 95% to a lower light reflection ratio of 30% within the relative light reflection ratio dynamic range is suitable for multi-level recording and reproduction, whereas a material B has a characteristic that a range of light reflection ratios from a higher light reflection ratio of 70% to a lower light reflection ratio of 10% within the relative light reflection ratio dynamic range is suitable for the same. Therefore, it is preferable to use an optimum range depending on the material. However, in the conventional multi-level recording and reproduction methods, it is difficult to employ an optimum range within the above relative light reflection ratio dynamic range, for the multi-level optical recording medium, which can undesirably decrease the reliability of the multi-level recording and reproduction. What is more, in the conventional multi-level reproduction method, it is necessary to measure respective light reflection ratios of a predetermined number of virtual recording cells prior to reproducing record data, and at the same time identify how many levels the light reflection ratios of virtual recording cells are defined into and how the light reflection ratios of virtual recording cells are defined, based on the results of the measurement. For this reason, although the recording and reproduction methods are excellent, a process before the start of the recording or the reproduction is troublesome, and it takes time to carry out the process. Furthermore, during recording, a precious data-recording area is consumed only to measure the respective light reflection ratios dependent on degrees of change in properties of virtual recording cells. Therefore, it is preferable to improve these points.

The present invention has been made to solve the above described problems, and a main object thereof is to provide a multi-level optical recording medium, a multi-level recording method, and a multi-level reproduction method, which are capable of carrying out multi-level recording and reproduction of record data promptly and easily with high reliability without wastefully using a data-recording area.

The multi-level optical recording medium according to the present invention is a multi-level optical recording medium capable of recording record data according to multi-level recording that defines light reflection ratios of recording portions into multiple levels by switching an irradiation amount of a recording laser beam between multiple levels, wherein light reflection ratio information enabling identification of a light reflection ratio dynamic range within which respective light reflection ratios of the recording portions should be included is readably recorded.

According to this multi-level optical recording medium, the light reflection ratio information enabling identification of the light reflection ratio dynamic range within which the respective light reflection ratios of the recording portions should be included is readably recorded, whereby in recording record data, it is only required to record the record data such that the respective light reflection ratios of recording portions are included within the light reflection ratio dynamic range identified from the light reflection ratio information, and it is possible make it unnecessary to perform operation for checking the characteristics of the multi-level optical recording medium prior to recording the record data. Therefore, it is possible to record the record data promptly and easily with high reliability without wastefully using a data-recording area.

In this case, it is preferable that recording-portion light reflection ratio information enabling identification of a lowest light reflection ratio and a highest light reflection ratio out of the multiple levels of light reflection ratios of the recording portions is recorded as the light reflection ratio information. Due to this construction, it is possible to uniquely define the lowest light reflection ratio and the highest light reflection ratio based on the recording-portion light reflection ratio information, and hence it is possible to record and reproduce recorded data promptly and easily.

Further, it is preferable that first light reflection ratio information indicative of the lowest light reflection ratio, and second light reflection ratio information indicative of the highest light reflection ratio are recorded as the recording-portion light reflection ratio information. Due to this construction, it is possible to immediately identify values indicative of the lowest light reflection ratio and the highest light reflection ratio, and hence it possible to record and reproduce record data more promptly and easily.

Furthermore, it is preferable that relative light reflection ratios defined by converting a value of a light reflection ratio of an unrecorded portion of the multi-level optical recording medium to 100% are recorded as the recording-portion light reflection ratio information. Due to this construction, in the multi-level optical recording medium in which the light reflection ratio of the unrecorded portion does not have a unique value but various values, the respective light reflection ratios of recording portions can be defined based on light reflection ratios set with reference to the light reflection ratio of the unrecorded portion. This makes it possible to record and reproduce record data more promptly and easily in comparison with e.g. a multi-level optical recording medium on which absolute light reflection ratios defined by converting the value of a light reflection ratio of a reference reflecting surface to 100% are recorded.

Further, it is preferable that the light reflection ratio information is recorded in either of an area which is read out first by a recording and reproducing apparatus when the multi-level optical recording medium is loaded in the recording and reproducing apparatus, and an area which is capable of being identified by area information recorded in the area which is read out first. Due to this construction, when record data is recorded and reproduced, it is possible to cause the recording and reproducing apparatus to record and reproduce the record data reliably and promptly since the light reflection ratio information is read out simply by loading the multi-level optical recording medium in the recording and reproducing apparatus.

Further, it is preferable that the multi-level optical recording medium is configured such that the record data can be recorded by multi-level recording at N levels (N is a natural number equal to or larger than 5), and recording data level information to the effect that the multi-level optical recording medium is a medium for recording the record data by the multi-level recording at N levels is recorded. Due to this construction, even if the number of levels to which light reflection ratios should be controlled is not fixed, it is possible to record and reproduce record data reliably and promptly according to the record data level information.

Further, it is preferable that the light reflection ratio information is recorded by means of a wobble in a groove for guiding a reproducing laser beam. Due to this construction, it is possible to prevent details of record data from being degraded due to the aging, thereby making it possible to sufficiently enhance accuracy in reading the light reflection ratio information.

The multi-level recording method according to the present invention is a multi-level recording method of recording record data by the multi-level recording on any of the multi-level optical recording media described above, wherein the light reflection ratio information is read out prior to recording the record data, and the record data is recorded such that the respective light reflection ratios of the recording portions are included within the light reflection ratio dynamic range identified based on the light reflection ratio information read out.

According to this multi-level recording method, the light reflection ratio information is read out prior to recording record data, and the record data is recorded such that the respective light reflection ratios of recording portions are included within the light reflection ratio dynamic range identified based on the light reflection ratio information read out, whereby it is possible to immediately record the record data without checking the characteristics of the multi-level optical recording medium prior to recording the record data, such that the respective light reflection ratios of the recording portions are included within the light reflection ratio dynamic range identified from the light reflection ratio information.

The multi-level reproduction method according to the present invention is a multi-level reproduction method of reproducing record data recorded by the multi-level recording on any of the multi-level optical recording media described above, wherein the recording-portion light reflection ratio information is read out prior to reproducing the record data, and record data which are read out at the lowest light reflection ratio and the highest light reflection ratio identified based on the recording-portion light reflection ratio information, are reproduced as data recorded with the smallest irradiation amount of the recording laser beam, and data recorded with the largest irradiation amount of the recording laser beam.

According to this multi-level reproduction method, recording-portion light reflection ratio information is read out prior to reproduction of record data, and record data read out at the lowest light reflection ratio and record data read out at the highest light reflection ratio identified based on the recording-portion light reflection ratio information, are reproduced as data recorded with the smallest irradiation amount of the recording laser beam, and data recorded with the largest irradiation amount of the recording laser beam, respectively, whereby it is possible to reliably and promptly reproduce the record data recorded on the multi-level optical recording medium at the light reflection ratios, without checking the light reflection ratios prior to reproducing the record data, whenever the recorded data are reproduced.

It should be noted that the present disclosure relates to the subject matter included in Japanese Patent Application No. 2001-169915 filed on Jun. 5, 2001, and it is apparent that all the disclosures therein are incorporated herein by reference.

BRIEF DESCRIPTION OF DRAWINGS

FIG. 1 is a perspective view, partly cut-away, to show the construction of an optical recording medium 1 according to an embodiment of the present invention;

FIG. 2 is a conceptual view conceptually showing recording marks Ma to Mg recorded in the optical recording medium 1;

BEST MODE FOR CARRYING OUT THE INVENTION

Figure 3:
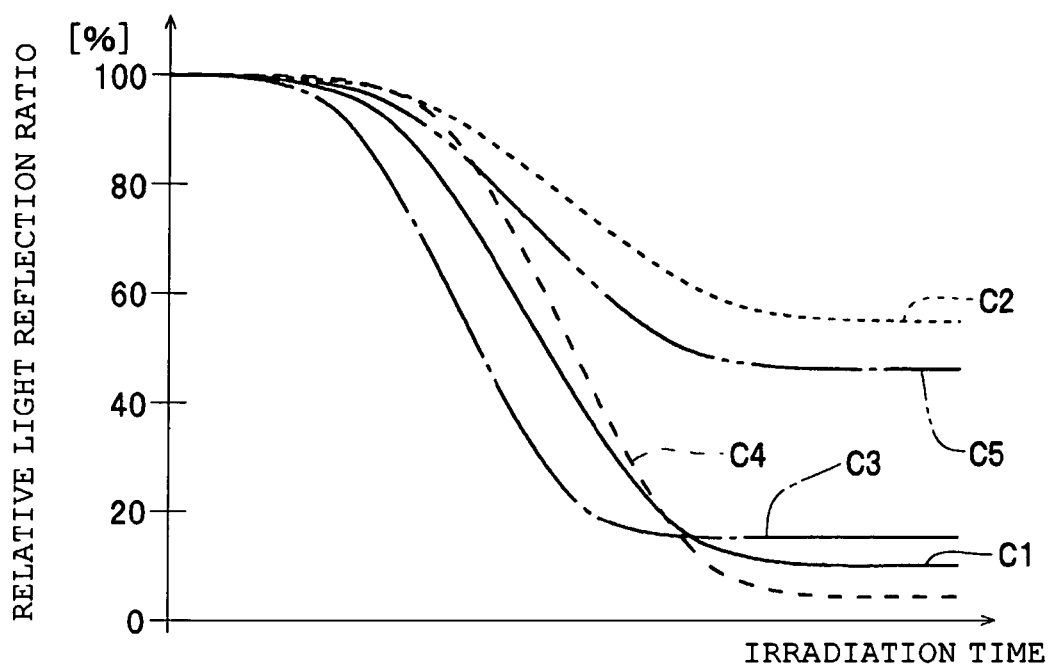
FIG. 3 is a characteristics diagram showing the relative light reflection ratio characteristics of optical recording media 1 formed by using various kinds of organic dyes.

Hereinafter, preferred embodiments of a multi-level optical recording medium, and a multi-level recording method and a multi-level reproduction method for the multi-level optical recording medium, according to the present invention, will be described with reference to the accompanying drawings.

First of all, the construction of the multi-level optical recording medium 1 (hereinafter also referred to as the "optical recording medium 1") according to the present invention will be described with reference to FIG. 1.

The optical recording medium 1 is a CD-R optical recording medium (write-once/read-many type optical recording medium), and as shown in FIG. 1, is comprised of a substrate 11, a recording layer 12, a reflecting film 13, and a protective layer 14. The substrate 11 is formed to have a disk shape, by using a transparent resin as a base material. In one surface (upper surface as viewed in FIG. 1) of the substrate 11 are spirally formed a groove 11a for guiding a laser beam, and a land 11b, from a location close to the central portion of the substrate 11 toward the outer periphery thereof. The recording layer 12 is formed using an organic dye, such as cyanine, merocyanine, a methine-based dye and derivatives thereof, a benzenethiol metal complex, a phthalocyanine dye, a naphthalocyanine dye, or an azo dye, by applying the organic dye on the base 11 such that the organic dye covers the groove 11a and the land 11b. The recording layer 12 is decomposed and changed in properties by being irradiated with a laser beam by a recording apparatus, and the light transmission ratio of the recording layer 12 is changed according to the irradiation amount of the laser beam. The reflecting film 13 is a thin film layer for reflecting a reproducing laser beam having passed through the substrate 11 and the recording layer 12 when record data recorded on the optical recording medium 1 is reproduced, and is formed on the recording layer 12 e.g. by sputtering, using a metal, such as gold or silver, as a main raw material. The protective layer 14 is for protecting the reflecting film 13 and the recording layer 12, and formed in a manner covering the outer surface of the reflecting film 13.

Next, the recording principle of the optical recording medium 1 will be described with reference to drawings.

Referring to FIG. 1, in the optical recording medium 1, virtual recording cells S, S, . . . , which are obtained by virtually dividing the groove 11a along the direction of rotation (along the circumference) of the optical recording medium 1, are defined as units for recording. Now, as shown in FIG. 2, the length of each virtual recording cell S in a direction along the groove 11a is defined to be smaller than a focused beam diameter D (diameter of a beam waist).

In this case, the irradiation time of a recording laser beam (i.e. the irradiation amount of a laser beam) emitted from a pickup of the recording apparatus is controlled to multiple levels according to the values of recording data, whereby as shown in FIG. 2, recording marks Ma to Mg (hereinafter, also referred to as the "recording marks M" when they are not discriminated from each other) which are different in degree of decomposition and change in properties of the recording layer 12 (mainly made of an organic dye) are formed in the virtual recording cells S. It should be noted that in the same figure, the degrees of decomposition and change in properties of the recording layer 12 are conceptually shown by the sizes of the recording marks M. Further, when recording data are recorded by the recording laser beam, the optical recording medium 1 is irradiated with the recording laser beam while being rotated, which causes the recording marks M to have elliptical shapes being lengths dependent on irradiation times.

Further, when multi-level recording is carried out on the optical recording medium 1, the respective degrees of decomposition and change in properties (the amounts of change in the light transmission ratio) of the recording marks Ma to Mg are defined such that the light reflection ratios of the virtual recording cells S exhibited when the reproducing laser beam is irradiated onto the virtual recording cells S are e.g. at seven levels (eight levels when an unrecorded portion is included). In this case, each light reflection ratio is larger as the degree of decomposition and change in properties of the recording layer 12 is smaller. Therefore, a virtual recording cell S with no recording mark recorded thereon has the characteristic of a maximum light reflection ratio, and the virtual recording cell S with the smallest recording mark Ma recorded thereon has the characteristic of the largest light reflection ratio of all the virtual recording cells S with the recording marks M recorded thereon. The respective virtual recording cells S having the recording marks Mb to Mf recorded thereon are reduced in light reflection ratio in the order of the recording marks Mb to Mf, and the virtual recording cell S with the largest recording mark Mg recorded thereon has the characteristic of the minimum light reflection ratio. Therefore, by properly setting the area ratios of portions decomposed and changed in properties (i.e. the light transmission ratios of the recording layer 12) by controlling the irradiation amount of the laser, it is possible to form the recording marks Ma to Mg having respective seven levels of light reflection ratios.

Next, the characteristics of the organic dyes used for forming the recording layer 12 of the optical recording medium 1 will be described with reference to drawings.

In general, organic dyes used for the recording layer 12 have a characteristic that as the irradiation time (irradiation amount) of the recording laser beam is increased, the degree of decomposition and change in properties of each organic dye is also increased. On the other hand, the change in light reflection ratio in this case is not linear with respect to the irradiation time (irradiation amount) of the recording laser beam. Further, the degree of decomposition and change in properties of the organic dye, dependent on the irradiation time (irradiation amount) of the recording laser beam, has a characteristic that the degree is gently increased for some time from the start of the irradiation, and sharply and linearly increased after the lapse of a predetermined time period. Then, it is gently increased again, and after the irradiation time has exceeded a certain time period, it is hardly increased. Further, the light transmission ratio of the organic dye which is not decomposed or changed in properties, the light transmission ratio of the organic dye which is most decomposed and changed in properties (the organic dye which has been decomposed and changed in properties to such an extent that the degree of decomposition and change in properties thereof is hardly increased), and the amount of change in the light transmission ratio corresponding to a degree of decomposition and change in properties of the organic dye also vary with the material of an organic dye used. Therefore, assuming that e.g. five kinds of optical recording media 1 are produced which have recording layers 12 formed by organic dyes different from each other, respective absolute light reflection ratios of the recording layers 12 of the optical recording media 1 are different from each other. In this case, the term "absolute light reflection ratio" is intended to mean a light reflection ratio of an unrecorded portion (unrecorded virtual recording cell S) of the recording layer 12 of each optical recording medium 1, which is measured in comparison with a reference light reflection ratio, assuming that the value of a light reflection ratio of a disk body having a thin film of gold or the like formed on a smooth surface thereof e.g. by sputtering, is converted to the reference light reflection ratio (100%). Further, the characteristics of relative light reflection ratios on the recording layers 12 of the optical recording media 1 are also different from each other, as shown by characteristic curves C1 to C5 appearing in FIG. 3. It should be noted that as shown in the same figure, the aforementioned degree of the decomposition and change in properties of the organic dye contributes to the inclination of each of the characteristic curves C1 to C5. In this case, the term "relative light reflection ratio" is intended to mean a ratio of the light reflection ratio dependent on an irradiation time of a recording portion (i.e. a recorded virtual recording cell S) of the recording layer 12 of each optical recording medium 1, provided that the value of the absolute light reflection ratio of an unrecorded portion (i.e. an unrecorded virtual recording cell S) of the recording layer 12 of each optical recording medium 1 is converted to 100%. Further, the absolute light reflection ratios and the relative light reflection ratios are different on an organic dye-by-organic dye basis, which causes characteristics, such as modulations, dynamic ranges, jitter characteristics, and B.E.R (Bit Error Rate), of the optical recording media 1 to be also different from each other. Furthermore, the above characteristics also vary not only with the material of an organic dye but also with parameters, such as thickness of coating of the organic dye, the structure of the groove 11a (the depth, width, and shape thereof), and the material of a reflecting film 13.

In this case, since the multi-level recording cannot be carried out on the optical recording medium 1, until the light reflection ratio of the optical recording medium 1 is accurately controlled to multiple levels, it is difficult to reproduce record data recorded at multiple levels unless the absolute light reflection ratio of a recording portion (unrecorded virtual recording cell S) having the largest light reflection ratio is large to some extent (e.g. 40% to 80%), and at the same time the difference in light reflection ratio between a recording portion having the largest absolute light reflection ratio, and a recording portion (virtual recording cell S formed with the recording mark Mg) having the smallest absolute light reflection ratio is large to some extent. As the absolute light reflection ratio is larger, it is more preferable. However, in general, it is difficult to secure a value larger than 80%, since the amount of the reproducing laser beam returned to the pickup of a playback apparatus is reduced due to diffuse reflection caused depending on the above characteristics of the parameters and the structure of the groove 11a. Further, when a value of the light reflection ratio of a recording portion (unrecorded virtual recording cell S), which is not decomposed or changed in properties, is converted to 100% and a ratio of a value of the light reflection ratio of a recording portion most decomposed and changed in properties (virtual recording cell S decomposed and changed in properties to such an extent that the degree of decomposition and change in properties is hardly increased) is defined as a relative light reflection ratio dynamic range, the relative light reflection ratio is nonlinearly changed with respect to the irradiation time (irradiation amount) of the laser beam due to the characteristics of the organic dye described above, in an unrecorded portion-side region (approximately two tenths) of the relative light reflection ratio dynamic range, and a region (approximately two tenths) of the relative light reflection ratio dynamic range on the side of the recording portion most decomposed and changed in properties, whereas in a region of approximately six tenths of the relative light reflection ratio dynamic range, as an intermediate region between the aforementioned two regions, the relative light reflection ratio is linearly changed with respect to the irradiation time. Therefore, it is preferable that in the optical recording medium 1, the absolute light reflection ratio of a recording portion having the largest light reflection ratio is within a range of 40% to 80%, and the difference in light reflection ratio between a recording portion having the largest absolute light reflection ratio (virtual recording cell S formed with the recording mark Ma) and a recording portion having the smallest absolute light reflection ratio (virtual recording cell S formed with the recording mark Mg) is larger than 40 points. It should be noted that the ratio between the above two regions each occupying approximately two tenths of the range on the unrecorded portion side and the recording portion side, and the region occupying approximately six tenths of the same as the intermediate region between the above two regions largely depends on the characteristics of an organic dye used for the recording layer 12, and cannot be defined unconditionally.

Figure 4:
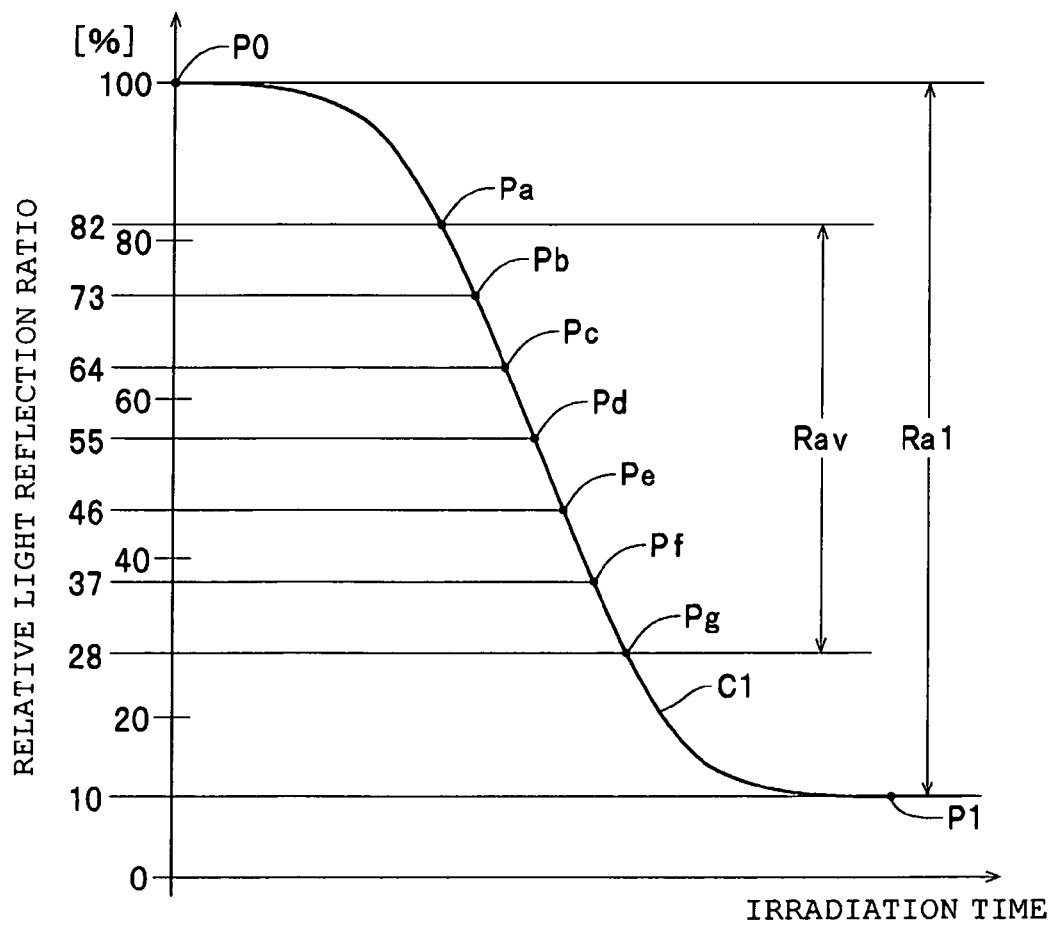
FIG. 4 is a characteristics diagram showing the relative light reflection ratio characteristics of an organic dye used for a recording layer 12 of the optical recording medium 1.

Next, the characteristics of the optical recording medium 1 will be described in further detail with reference to FIG. 4. It should be noted that the following description will be given assuming that the recording layer 12 of the optical recording medium 1 is formed by using an organic dye having characteristics indicated by the characteristic curve C1 shown in FIG. 3.

In the recording layer 12 of the above optical recording medium 1, when the value of the light reflection ratio (light reflection ratio indicated by a point P0 on the characteristic curve C1) of part thereof which is not decomposed or changed in properties, is converted to 100%, in a relative light reflection ratio dynamic range Ra1 set by the above conversion, the light reflection ratio (light reflection ratio indicated by a point P1 on the characteristic curve C1) of a portion most decomposed and changed in properties is e.g. 10%. Therefore, the relative light reflection ratios of the virtual recording cells S having the recording marks Ma to Mg recorded thereon, respectively, are defined such that they are included in the region occupying approximately six tenths of the relative light reflection ratio dynamic range Ra1 as the intermediate region. In this case, it is preferable that differences (intervals) between the respective relative light reflection ratios (light reflection ratios indicated by points Pa to Pg on the characteristic curve C1) of the virtual recording cells S having the recording marks Ma to Mg recorded thereon are approximately even. Therefore, the relative light reflection ratios are defined to be e.g. 82%, 73%, 64%, 55%, 46%, 37%, and 28%, respectively. Hereinafter, the region including the respective relative light reflection ratios of the virtual recording cells S, S, . . . having the respective recording marks Ma to Mg recorded thereon is also referred to as the "recording portion relative light reflection ratio dynamic range Rav". It should be noted that the values of the aforementioned relative light reflection ratios largely depend on the characteristics of an organic dye used for the recording layer 12, and cannot be defined unconditionally.

In the above case, the values defined as the respective relative light reflection ratios of the virtual recording cells S having the recording marks Ma to Mg recorded thereon are different from each other depending e.g. on the material of an organic dye used for the recording layer 12, as described above. Therefore, in the optical recording medium 1, information enabling identification of the recording portion relative light reflection ratio dynamic range Rav dependent on the material of an organic dye used for the recording layer 12 and the like is recorded in advance when the optical recording medium 1 is produced, whereby values to be defined as the respective relative light reflection ratios of the virtual recording cells S having the recording marks Ma to Mg recorded thereon are defined. More specifically, in the optical recording medium 1, light reflection ratio information (first light reflection ratio information in the present invention; hereinafter also referred to as the "maximum light reflection ratio information") concerning a maximum light reflection ratio in the recording portion relative light reflection ratio dynamic range Rav, and light reflection ratio information (second light reflection ratio information in the present invention; hereinafter also referred to as the "minimum light reflection ratio information") concerning a minimum light reflection ratio in the recording portion relative light reflection ratio dynamic range Rav are recorded in a lead-in area e.g. by means of a wobble. In this case, the lead-in area is an area which is read out first when the optical recording medium 1 is loaded in a recording and reproducing apparatus. In the optical recording medium 1, there are recorded not only the maximum light reflection ratio information and the minimum light reflection ratio information but also various kinds of information, such as information to the effect that the optical recording medium 1 is a multi-level optical recording medium (hereinafter also referred to as the "medium identifying information"), and information to the effect that data is recorded by the multi-level recording at seven levels exclusive of an unrecorded portion having no recording mark M recorded thereon (hereinafter also referred to as the "recording data level information"). Further, the wobble is fixedly formed as a very slight meandering portion of the groove 11a when the substrate 11 is molded. Therefore, it is possible to prevent the recorded data from being degraded due to the aging, thereby making it possible to enhance accuracy in the reading of the light reflection ratio information.

Figure 5:
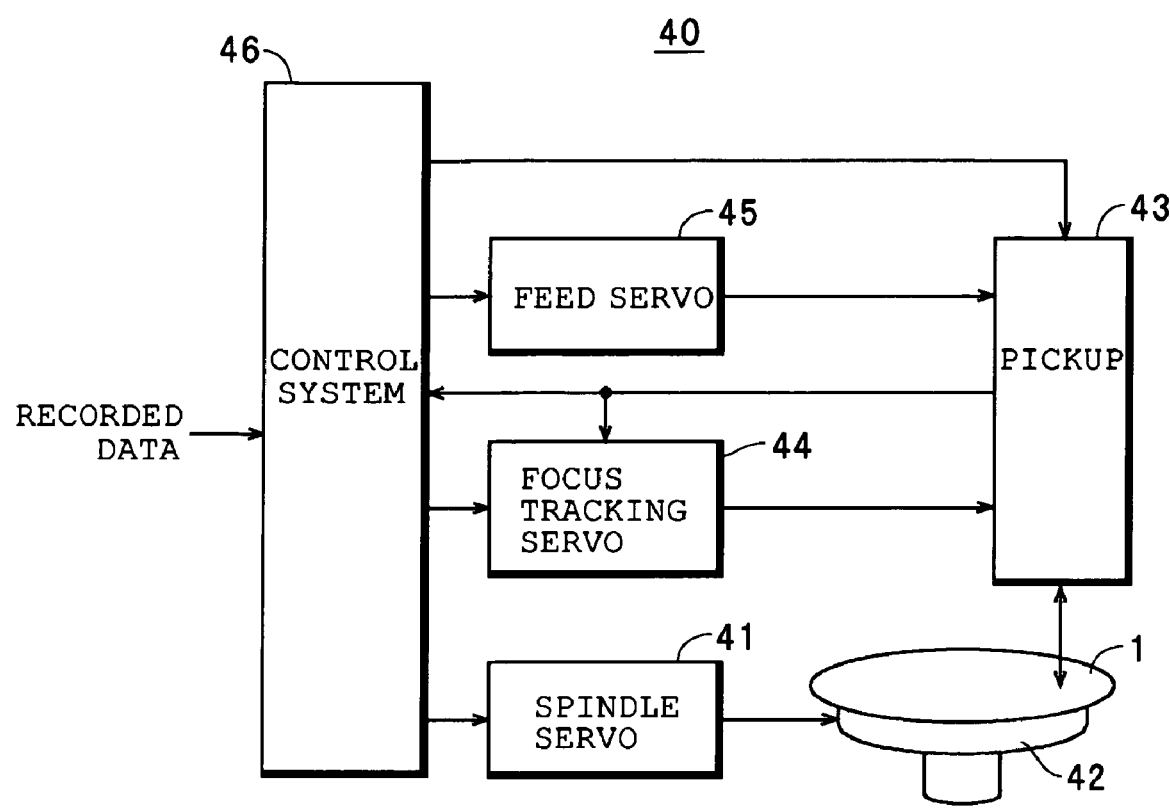
FIG. 5 is a block diagram showing the arrangement of an optical recording and reproducing apparatus 40.

Next, an optical recording and reproducing apparatus 40 for recording record data on the optical recording medium 1, and reproducing the recorded data will be described with reference to FIG. 5.

The optical recording and reproducing apparatus 40 is a so-called CD-R recorder, and includes a spindle servo 41, a spindle motor 42, a pickup 43, a focus tracking servo 44, a feed servo 55, and a control system 46. In the present embodiment, the spindle motor 42 is driven by the spindle servo 41 to rotate the optical recording medium 1 at a constant linear velocity. In the pickup 43, a laser, not shown, is driven by a laser driver, not shown, under the control of the control system 46, to thereby irradiate a recording laser beam or a reproducing laser beam to the optical recording medium 1. As a result, the recording marks M are recorded on virtual recording cells S, and an electric signal is output according to the levels of laser beams reflected from the virtual recording cells S having the recording marks M recorded thereon. In this case, when the record data is recorded, the laser driver of the pickup 43 adjusts the irradiation amount (the number of laser pulses, and/or irradiation power, pulse height, etc.) of the laser beam irradiated onto one virtual recording cell S, in accordance with control of the control system 46, depending on details of record data. It should be noted that the irradiation amount of a laser beam can be adjusted not only by the adjusting method using the laser driver but also by a method of controlling the driving of an optical modulator disposed on an optical path of the laser beam by the control system 46.

Further, the pickup 43 includes an objective lens and a half mirror, neither of which is shown, to thereby cause a recording or reproducing laser beam to be focuses onto the recording layer 12 of the optical recording medium 1. More specifically, the objective lens is controlled by the focus tracking servo 44, whereby the recording or reproducing laser beam is focused onto the recording layer 12 of the optical recording medium 1. The pickup 43 is caused to reciprocate by the feed servo 45 along the direction of the diameter of the optical recording medium 1 between the inner periphery side and the outer periphery side of the optical recording medium 1. The control system 46 controls driving of the spindle servo 41, the pickup 43, the focus tracking servo 44, and the feed servo 45, and reads record data recorded on the recording layer 12 based on the electric signal output from the pickup.

Next, a description will be given of the multi-level recording method of recording record data on the optical recording medium 1 by the optical recording and reproducing apparatus 40.

First, when the optical recording medium 1 is loaded in the optical recording and reproducing apparatus 40, the control system 46 controls the spindle servo 41 to thereby drive the spindle motor 42 for rotation of the optical recording medium 1. At the same time, the control system 46 drives the feed servo 45 to move the pickup 43 to the lead-in area. Then, the control system 46 causes the pickup 43 to emit the reading laser beam, and at the same time drives the focus tracking servo 44 for focus and tracking control of the objective lens of the pickup 43. As a result, the laser beam emitted from the pickup 43 is irradiated onto the lead-in area of the optical recording medium 1, and the reflected laser beam from the lead-in area is received by the pickup 43. In this step, the electric signal is output from the pickup 43 according to various kinds of information, such as the medium identifying information, the maximum light reflection ratio information, the minimum light reflection ratio information, and the record data level information, which are recorded in the lead-in area e.g. by means of a wobble, and based on the electric signal, the control system 46 reads the various kinds of information.

In this step, the control system 46 determines based on the read medium identifying information that the optical recording medium 1 is a multi-level optical recording medium. Next, the control system 46 identifies the recording portion relative light reflection ratio dynamic range Rav of the optical recording medium 1, based on the maximum light reflection ratio information and the minimum light reflection ratio information. Then, the control system 46 defines the respective relative light reflection ratios of the virtual recording cells S having the seven levels of recording marks Ma to Mg recorded thereon, as 82%, 73%, 64%, 55%, 46%, 37%, and 28%, based on the identified recording portion relative light reflection ratio dynamic range Rav and the record data level information. After that, when record data is recorded, the control system 46 records the recording marks Ma to Mg corresponding to the details of the data such that the recording marks Ma have the defined relative light reflection ratios, respectively. More specifically, the control system 46 controls the laser driver of the pickup 43 according to the recording marks M to be recorded, whereby the laser driver controls the irradiation amount of the recording laser beam irradiated onto one virtual recording cell S. Thus, the recording marks Ma to Mg corresponding to the details of the record data are sequentially recorded on the virtual recording cells S, S, . . . .

Next, a description will be given of the reproduction method of reproducing record data recorded on the optical recording medium 1 by the optical recording and reproducing apparatus 40.

First, as described above, when the optical recording medium 1 is loaded in the optical recording and reproducing apparatus 40, the control system 46 reads various kinds of information, such as the medium identifying information, the maximum light reflection ratio information, the minimum light reflection ratio information, and the record data level information, which are recorded in the lead-in area. Next, the control system 46 determines based on the read medium identifying information that the optical recording medium 1 is a multi-level optical recording medium, and identifies the recording portion relative light reflection ratio dynamic range Rav of the optical recording medium 1, based on the maximum light reflection ratio information and the minimum light reflection ratio information. Then, the control system 46 defines the respective relative light reflection ratios of the virtual recording cells S having the seven levels of recording marks Ma to Mg recorded thereon, as 82%, 73%, 64%, 55%, 46%, 37%, and 28%, based on the identified recording portion relative light reflection ratio dynamic range Rav and the record data level information. After that, the control system 46 reads the record data, assuming that the respective recording marks Ma to Mg are recorded on the virtual recording cells S having relative light reflection ratios of 82%, 73%, 64%, 55%, 46%, 37%, and 28%, respectively. Thus, the record data recorded on the optical recording medium 1 are reproduced. Although for ease of understanding the present invention, the description has been given using the values of the relative light reflection ratios given by way of example, this is not limitative. More specifically, the size of the virtual recording cell S, and the diameter of the focused recording or reproducing beam is selected as required. Therefore, the optical recording and reproducing apparatus 40 reads out record data after defining the relative light reflection ratios of the virtual recording cells S as required in accordance with a combination of the size of the virtual recording cells S and the diameter of the focused beam, such that influence of adjacent virtual recording cells S on the relative light reflection ratios functioning as thresholds can be eliminated as much as possible in reproducing the record data.

As described hereinabove, according to the optical recording medium 1, the maximum light reflection ratio information and the minimum light reflection ratio information, which enable identification of the recording portion relative light reflection ratio dynamic range Rav which should be defined as the relative light reflection ratios of the virtual recording cells S having the recording marks Ma to Mg recorded thereon, respectively, are recorded in advance when the optical recording medium 1 is produced, whereby it is made possible to immediately identify relative light reflection ratios which should be defined as the relative light reflection ratios of the virtual recording cells S having the recording marks Ma to Mg recorded thereon, without carrying out a measurement process in which the virtual recording cells S are changed in properties to multiple levels to thereby measure light reflection ratios respectively dependent on degrees of change in properties of the virtual recording cells S, or a measurement process for measuring respective light reflection ratios of a predetermined number of virtual recording cells S, S, . . . . Therefore, when record data is recorded on the optical recording medium 1, it is possible to define the respective relative light reflection ratios of the virtual recording cells S having the recording marks Ma to Mg recorded thereon, based on the recording portion relative light reflection ratio dynamic range Rav which is identified from the two pieces of the light reflection ratio information, and reliably record the recording marks Ma to Mg such that the recording marks Ma to Mg have the defined relative light reflection ratios, respectively. As a result, the record data can be recorded promptly and easily. Moreover, light reflection ratio information defining an optimum range of the relative light reflection ratio dynamic range, dependent on the material of the recording layer 12 is recorded in advance, whereby it is possible to sufficiently increase the reliability of the multi-level recording and reproduction. Further, when record data recorded on the optical recording medium 1 is reproduced, it is possible to define the respective relative light reflection ratios of the virtual recording cells S having the recording marks Ma to Mg recorded thereon, based on the identified recording portion relative light reflection ratio dynamic range Rav, and immediately read the recording marks Ma to Mg based on the defined relative light reflection ratios. As a result, the record data can be reproduced promptly and easily.

Further, according to the optical recording medium 1, the maximum light reflection ratio information and the minimum light reflection ratio information are recorded in the lead-in area, whereby when the optical recording medium 1 is loaded in the optical recording and reproducing apparatus, the maximum light reflection ratio information and the minimum light reflection ratio information are read in by the optical recording and reproducing apparatus prior to recording or reproducing record data, and hence it is possible to cause the optical recording and reproducing apparatus to record the recording marks M in a manner corresponding to the recording portion relative light reflection ratio dynamic range Rav dependent on the characteristics of the recording layer 12 and to accurately read the recording marks M recorded thereon.

It should be noted that the present invention is not limited to the above embodiment, but it can be modified as required. For example, although in the above described embodiment, an organic dye is employed for the recording layer 12 by way of example, this is not limitative, but the multi-level optical recording medium according to the present invention can also be applied to a multi-level optical recording medium using an organic dye other than the above-mentioned organic dyes or an inorganic material, for the recording layer 12. It can also be applied to a multi-level optical recording medium for multi-level recording by phase transition or magneto-optics. Further, although in the above described embodiment, the optical recording medium 1 is formed as a CD-R optical recording medium by way of example, this is not limitative, but the present invention can be generally applied to other recording media. Furthermore, the present invention is not limited to a disk-shaped rotary body. Further, although in the above described embodiment, the optical recording medium 1 is configured such that recording and reproducing laser beams are irradiated from the substrate 11 side, the optical recording medium 1 can also be applied to an optical recording medium configured such that a reflecting layer, a recording layer, and a protective layer are sequentially deposited on a substrate and the recording and reproducing laser beams are irradiated from the protective layer side. Further, the values of the light reflection ratios shown in the above described embodiment are given by way of example for ease of understanding the present invention, and hence can be changed as required. Furthermore, the multi-level optical recording medium according to the present invention includes various kinds of multi-level optical recording media on which multi-level recording can be carried out at a plurality of levels so long as the multi-level recording can be carried out at five levels or more.

Further, although in the above described embodiment, the maximum light reflection ratio information and the minimum light reflection ratio information as first reflectance information and second light reflection ratio information in the present invention are recorded by way of example, this is not limitative, but light reflection ratio information in the present invention may be, for example, information to the effect that a predetermined light reflection ratio is set to a reference light reflection ratio, and light reflection ratios in a range of several % larger than the light reflection ratio to several % smaller than the same are used, or information enabling identification of a light reflection ratio dynamic range within which the respective light reflection ratios of recording portions having the recording marks M recorded thereon should be included. In this case, the information enabling identification of the light reflection ratio dynamic range within which the respective light reflection ratios of the recording portions should be included is intended to mean information to the effect that the recording marks M be recorded such that the respective light reflection ratios of the recording portions are included within a range of a relative light reflection ratio of 85% to a relative light reflection ratio of 15%. Therefore, when the recording marks Ma to Mg are recorded based on the information, they may be recorded e.g. by setting the relative light reflection ratio of a virtual recording cell S having the recording mark Ma recorded thereon to 70%, and the relative light reflection ratio of a virtual recording cell S having the recording mark Mg recorded thereon to 30%.

Further, although in the embodiment of the present invention, the maximum light reflection ratio information and the minimum light reflection ratio information are recorded as relative light reflection ratios defined by converting a value of the light reflection ratio of an unrecorded portion having no recording mark M recorded thereon to 100% by way of example, this is not limitative, but it is also possible to record, as light reflection ratio information, absolute light reflection ratios defined by converting a value of the light reflection ratio of a disk body having a thin film of gold or the like formed on a smooth surface thereof e.g. by sputtering, to a reference light reflection ratio (100%). Further, although in the embodiment of the present invention, light reflection ratio information in the present invention is recorded in the lead-in area by means of a wobble by way of example, this is not limitative, but the light reflection ratio information may be recorded in any recording area so long as it is a recording area capable of being identified based on information recorded in the lead-in area, and the method of recording the light reflection ratio information is not limited to that using a wobble. For example, the light reflection ratio information can also be recorded by the groove 11a or a prepit of the land 11b, or recorded on the recording layer 12 by a recording laser beam. What is more, although the embodiment of the present invention is described taking the example of recording, in advance, information (recording data level information) to the effect that recording is carried out by multi-level recording at eight levels inclusive of that of an unrecorded portion, when the optical recording medium 1 is produced, the record data level information in the present invention is not always necessary. For example, when the number of levels of record data is defined in advance in a standard concerning the multi-level recording method, the record data-level information need not be recorded, but it is only required to control the light reflection ratios to multiple levels according to the standard.

INDUSTRIAL APPLICABILITY

As described hereinbefore, according to the multi-level optical recording medium of the present invention, light reflection ratio information enabling identification of a light reflection ratio dynamic range within which the respective light reflection ratios of recording portions should be included is readably recorded, whereby in recoding record data, it is only required to record the record data such that the respective light reflection ratios of recording portions are included within the light reflection ratio dynamic range identified from the light reflection ratio information. This can make it unnecessary to check the characteristics of the multi-level optical recording medium prior to recording the record data, so that it is possible to record the record data promptly and easily with high reliability without wastefully using a data-recording area. This makes it possible to realize a multi-level optical recording medium on which multi-level recording and reproduction of record data can be carried out promptly and easily with high reliability without wastefully using a data-recording area.

Further, according to the multi-level recording method of the present invention, the light reflection ratio information is read out before record data is recorded, and the record data is recorded such that the respective light reflection ratios of recording portions are included within the light reflection ratio dynamic range identified based on the light reflection ratio information read out, whereby it is possible to immediately record the record data without checking the characteristics of the multi-level optical recording medium prior to recording the record data, such that the respective light reflection ratios of the recording portions are included within the light reflection ratio dynamic range identified from the light reflection ratio information. This makes it possible to realize a multi-level recording method on which multi-level recording of record data can be performed promptly and easily with high reliability without wastefully using a data-recording area.

Further, according to the multi-level reproduction method of the present invention, recording-portion light reflection ratio information is read out prior to reproduction of record data, and the record data which are read out at the lowest light reflection ratio and the highest light reflection ratio identified based on the recording-portion light reflection ratio information, are reproduced as record data recorded with the smallest irradiation amount of a recording laser beam, and record data recorded with the largest irradiation amount of the recording laser beam, whereby it is possible to reliably and promptly reproduce the record data recorded on the multi-level optical recording medium at the light reflection ratios, without checking the light reflection ratios prior to reproducing the record data whenever the record data is reproduced. This makes it possible to realize a multi-level reproduction method which is capable of carrying out multi-level reproduction of record data promptly and easily with high reliability without wastefully using a data-recording area.

The invention claimed is:

1. A multi-level optical recording medium capable of recording record data according to a multi-level recording that defines light reflection ratios of recording portions into multiple levels by switching an irradiation amount of a recording laser beam between multiple levels,
    wherein light reflection ratio information enabling identification of a light reflection ratio dynamic range within which respective light reflection ratios of the recording portions should be included is readably recorded,
    wherein recording-portion light reflection ratio information enabling identification of a lowest light reflection ratio and a highest light reflection ratio out of the multiple levels of light reflection ratios of the recording portions is recorded as the light reflection ratio information.

2. A multi-level optical recording medium as claimed in claim 1, wherein first light reflection ratio information indicative of the lowest light reflection ratio, and second light reflection ratio information indicative of the highest light reflection ratio are recorded as the recording-portion light reflection ratio information.

3. A multi-level optical recording medium as claimed in claim 2, wherein relative light reflection ratios defined by converting a value of a light reflection ratio of an unrecorded portion of the multi-level optical recording medium to 100% are recorded as the recording-portion light reflection ratio information.

4. A multi-level optical recording medium as claimed in claim 2, wherein the light reflection ratio information is recorded in either of an area which is read out first by a recording and reproducing apparatus when the multi-level optical recording medium is loaded in the recording and reproducing apparatus, and an area which is capable of being identified by area information recorded in the area which is read out first.

5. A multi-level optical recording medium as claimed in claim 2, which is configured such that the record data can be recorded by multi-level recording at N levels (N is a natural number at least equal to 5), and wherein recording data level information to the effect that the multi-level optical recording medium is a medium for recording the record data by the multi-level recording at N levels is recorded thereon.

6. A multi-level optical recording medium as claimed in claim 2, wherein the light reflection ratio information is recorded by means of a wobble in a groove for guiding a reproducing laser beam.

7. A multi-level optical recording medium as claimed in claim 1, wherein relative light reflection ratios defined by converting a value of a light reflection ratio of an unrecorded portion of the multi-level optical recording medium to 100% are recorded as the recording-portion light reflection ratio information.

8. A multi-level optical recording medium as claimed in claim 7, wherein the light reflection ratio information is recorded in either of an area which is read out first by a recording and reproducing apparatus when the multi-level optical recording medium is loaded in the recording and reproducing apparatus, and an area which is capable of being identified by area information recorded in the area which is read out first.

9. A multi-level optical recording medium as claimed in claim 7, which is configured such that the record data can be recorded by multi-level recording at N levels (N is a natural number at least equal to 5), and wherein recording data level information to the effect that the multi-level optical recording medium is a medium for recording the record data by the multi-level recording at N levels is recorded thereon.

10. A multi-level optical recording medium as claimed in claim 7, wherein the light reflection ratio information is recorded by means of a wobble in a groove for guiding a reproducing laser beam.

11. A multi-level optical recording medium as claimed in claim 1, wherein the light reflection ratio information is recorded in either of an area which is read out first by a recording and reproducing apparatus when the multi-level optical recording medium is loaded in the recording and reproducing apparatus, and an area which is capable of being identified by area information recorded in the area which is read out first.

12. A multi-level optical recording medium as claimed in claim 1, which is configured such that the record data can be recorded by multi-level recording at N levels (N is a natural number at least equal to 5), and wherein recording data level information to the effect that the multi-level optical recording medium is a medium for recording the record data by the multi-level recording at N levels is recorded thereon.

13. A multi-level optical recording medium as claimed in claim 1, wherein the light reflection ratio information is recorded by means of a wobble in a groove for guiding a reproducing laser beam.

14. A multi-level recording method of recording record data by the multi-level recording on the multi-level optical recording medium as claimed in claim 1,
wherein the light reflection ratio information is read out prior to recording the record data, and the record data is recorded such that the respective light reflection ratios of the recording portions are included within the light reflection ratio dynamic range identified based on the light reflection ratio information read out.

15. A multi-level reproduction method of reproducing record data recorded by the multi-level recording on the multi-level optical recording medium as claimed in claim 1,
wherein the recording-portion light reflection ratio information is read out prior to reproducing the record data, and record data which are read out at the lowest light reflection ratio and the highest light reflection ratio identified based on the recording-portion light reflection ratio information, are reproduced as data recorded with the smallest irradiation amount of the recording laser beam, and data recorded with the largest irradiation amount of the recording laser beam.

* * * * *